(12) United States Patent
Steinruck

(10) Patent No.: US 6,454,238 B1
(45) Date of Patent: Sep. 24, 2002

(54) VALVE

(75) Inventor: Peter Steinruck, Hallstatt (AT)

(73) Assignee: Hoerbiger Kompressortechnik Services GmbH, Vienna (AT)

( * ) Notice: Subject to any disclaimer, the term of this patent is extended or adjusted under 35 U.S.C. 154(b) by 0 days.

(21) Appl. No.: 09/876,030

(22) Filed: Jun. 8, 2001

(51) Int. Cl.$^7$ .............................................. F16K 31/12
(52) U.S. Cl. ............................. 251/30.01; 251/129.07; 251/63.06; 123/446
(58) Field of Search .............................. 251/30.01, 282, 251/63.5, 63.6, 57, 129.07; 123/467, 446

(56) References Cited

U.S. PATENT DOCUMENTS

| | | | | |
|---|---|---|---|---|
| 3,893,629 A | * | 7/1975 | Okamoto | 239/585 |
| 4,172,582 A | * | 10/1979 | Bobnar | 251/63 |
| 4,529,164 A | * | 7/1985 | Igashira et al. | 251/129 |
| 4,562,862 A | * | 1/1986 | Mucheyer et al. | 137/522 |
| 4,589,627 A | * | 5/1986 | Grotloh | 251/25 |
| 4,682,756 A | * | 7/1987 | Hartwig et al. | 251/63.5 |
| 4,796,667 A | * | 1/1989 | Kehl et al. | 137/629 |
| 4,809,746 A | * | 3/1989 | Wolfges | 137/501 |
| 4,850,394 A | * | 7/1989 | Imhof et al. | 137/554 |
| 4,909,440 A | * | 3/1990 | Mitsuyasu et al. | 239/96 |
| 4,930,464 A | * | 6/1990 | Letsche | 123/90.12 |
| 5,275,136 A | * | 1/1994 | Schechter et al. | 123/90.12 |
| 5,803,429 A | * | 9/1998 | Tsuzuki et al. | 251/30.04 |
| 5,839,661 A | * | 11/1998 | Iwanaga | 239/88 |
| 5,875,764 A | * | 3/1999 | Kappel et al. | 123/467 |
| 5,915,361 A | * | 6/1999 | Heinz et al. | 123/467 |
| 6,021,760 A | * | 2/2000 | Boecking | 123/467 |
| 6,062,532 A | * | 5/2000 | Gurich et al. | 251/57 |
| 6,067,946 A | * | 5/2000 | Bunker et al. | 123/90.12 |
| 6,129,332 A | * | 10/2000 | Dusterhoft | 251/28 |
| 6,328,017 B1 | * | 12/2001 | Heinz et al. | 123/467 |
| 6,168,133 B1 | * | 1/2002 | Heinz et al. | 251/57 |

FOREIGN PATENT DOCUMENTS

| | | |
|---|---|---|
| EP | 0425327 | 5/1994 |
| JP | 58128588 | 8/1983 |

* cited by examiner

Primary Examiner—Henry C. Yuen
Assistant Examiner—Frederick Nicolas
(74) Attorney, Agent, or Firm—Dykema Gossett PLLC

(57) ABSTRACT

A valve for bringing gaseous fuel into the combustion chamber (1) of gas engines includes a solenoid valve (5) controlling the fuel supply (2) and an adjoining check valve (7) designed as a poppet valve, which is closed by the force of a spring and which opens in the direction of the combustion chamber through the pressure of gas flowing from the opened solenoid valve (5). The stem (11) of a poppet is connected to a step piston (12) on the side that faces away from the head (10) of the poppet whereby the step piston's larger upper side (13) facing away from the poppet and the opposite smaller underside (14) are biased by the fuel pressure existing in an intermediate chamber (9) located between the solenoid valve (5) and the head (10), and whereby the step piston's step area (15), being the difference between the two step piston areas (13, 14), is influenced by an essentially constant pressure, and whereby the step area (15) of the step piston (12) is significantly larger than the actuation area that remains between the stem and the seat area of the valve opening.

4 Claims, 1 Drawing Sheet

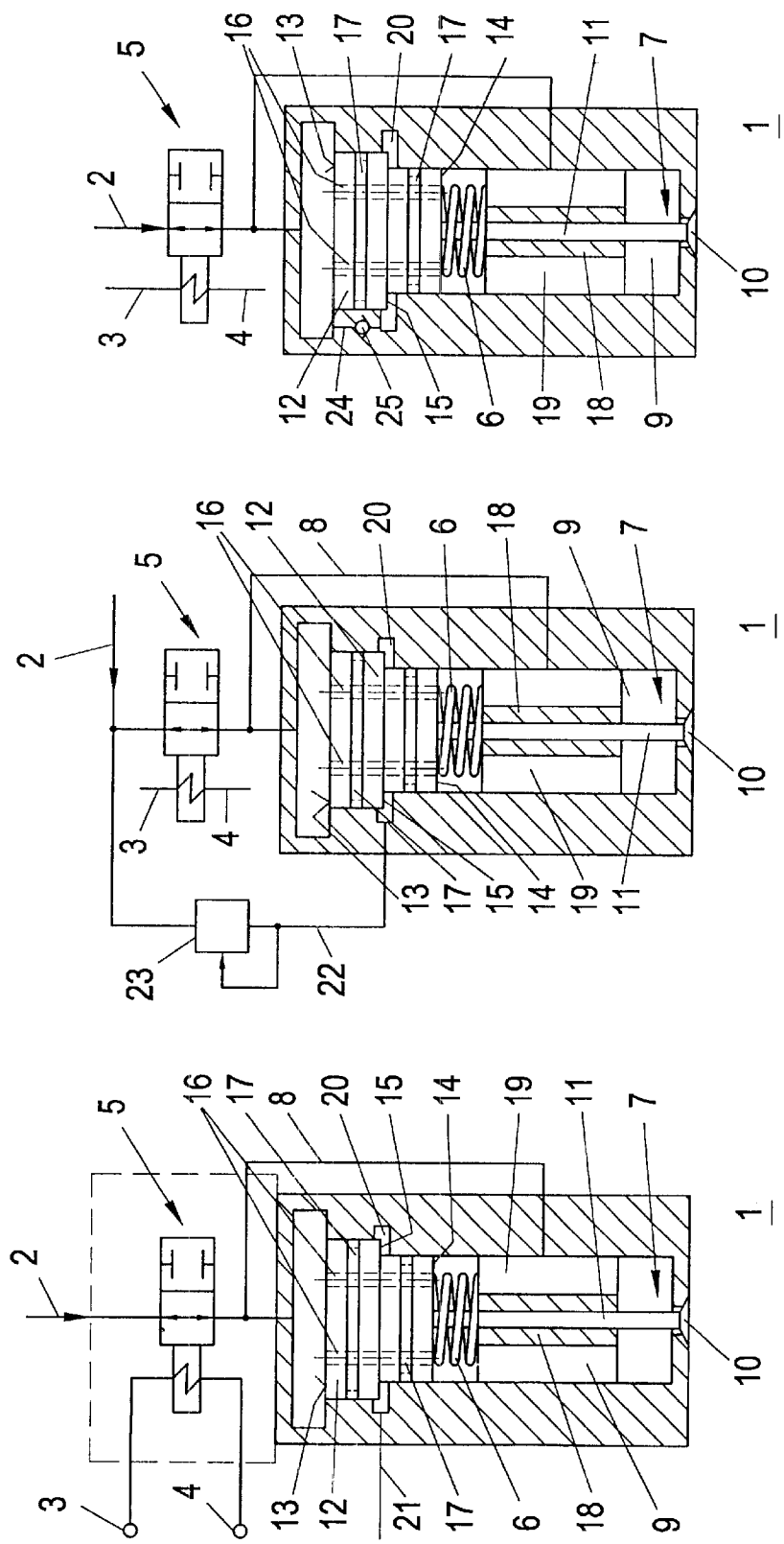

VALVE

BACKGROUND OF THE INVENTION

1. Field of the Invention

The invention relates to a valve for bringing gaseous fuel into the combustion chamber of gas engines including a solenoid valve controlling the fuel supply and an adjoining check valve designed as a poppet valve which is closed by the force of a spring and which opens in the direction of the combustion chamber through the pressure of gas flowing from the opened solenoid valve.

2. The Prior Art

Valves of this type are known from JP 58-128 588 and EP 0 425 327 B1, for example, which make possible direct metering of gaseous fuels into the combustion chamber of reciprocating engines. The pressurized gaseous fuel is guided through the electrically controlled solenoid valve to the check valve, which is closed by the force of a spring, designed as a poppet valve, and disposed on the side of combustion chamber. The poppet valve is subsequently opened through the rising gas pressure after overcoming the closing force of the spring. After closing of the solenoid valve, the gas located in the intermediate volume between the solenoid valve and the poppet valve escapes further into the combustion chamber until the closing force of the closing spring of the poppet valve becomes effective again against the decreasing gas pressure and it thereby closes the poppet valve.

In the disclosed arrangements with its described simple concept it has been shown—especially from examination of the combustion exhaust fumes—that under some operational conditions, undesirable high emissions of unburned hydrocarbon occur that originate obviously from the fuel that enters the combustion chamber even after the completion of the actual combustion process.

It is the object of the present invention to improve valves of the type above whereby the described disadvantages are avoided and whereby particularly undesirable emissions of unburned hydrocarbon in the exhaust fumes are avoided with certainty as it may occur by the fuel entering the combustion chamber after completion of the actual combustion.

SUMMARY OF THE INVENTION

The present invention is based on the following ideas to achieve this object:

Metering of the gaseous fuel is performed with the present valves during the compression stroke, which means after the start of compression of the amount of air captured in the working chamber of the engine. The fuel supply stops at an interior cylinder pressure that clearly lies above the suction pressure or the counter-pressure of the exhaust system. A gas pressure develops thereby in the intermediate volume between the check valve and the solenoid valve whereby the pressure lies above the interior cylinder pressure at the end of the fuel supply, and whereby the amount of excess pressure depends essentially on the mass of the poppet valve, the pressure and flow forces influencing the poppet valve, the closing force of the spring, the effective flow area of the poppet valve, and the size of the intermediate volume.

The interior cylinder pressure increases further after closing of the poppet valve at the end of the fuel supply and thus the closing forces influencing the poppet valve are further increased as well. The closing forces influencing the poppet valve from the side of the combustion chamber, which are boosted by the spring force of the closing spring, subsequently drop again during the downward movement of the piston in the cylinder during the working stroke whereby the poppet valve may obviously open briefly depending on the amount of gas pressure that actually prevails in the intermediate volume. This leads to the escape of a certain amount of fuel stored in the intermediate volume into the working chamber. Since at this point the temperature inside the working chamber is generally too low for fuel combustion, the fuel that subsequently enters the working chamber leaves the cylinder at least partially unburned and causes thereby undesirable increases in emission.

According to the invention it has to be assumed therefore that the possibly largest excess in closing force must exist toward the end of the closing phase of the poppet valve so that the re-opening of the valve is prevented with certainty after the completed combustion. For the achievement of this object there is additionally the difficulty that during the flow of the gaseous fuel around the valve, on the upper side of the poppet valve a pressure develops that lies below the static pressure in the intermediate volume. According to the high velocity of the gaseous fuel, which lies in the order of magnitude of the speed of sound, a pressure drop is created on the side facing the valve stem. Thus, the force balance initiating the closing movement is reached only at a higher pressure differential between the intermediate volume and the working chamber as compared to the transferred closing force of the spring of the poppet valve onto the pressure-biased surface of the poppet valve. The excess of the closing force at the end of the closing phase of the poppet valve is thus significantly reduced. It is thereby practically impossible to avoid under all circumstances the re-opening of the poppet valve at the end of the working stroke simply by suitable balancing of structural conditions of the known valve.

For the dependable solution of this problem and according to the invention, the closing element of the poppet valve is connected to a step piston on the side that faces away from the poppet valve whereby the step piston's larger upper side facing away from the poppet and the opposite smaller underside are biased by the fuel pressure existing in the intermediate chamber located between the solenoid valve and the poppet valve, and whereby the step piston's step area, being the difference between the two step piston areas, is influenced by an essentially constant pressure, and whereby the step area of the step piston is significantly larger than the actuation area of the poppet valve that remains between the stem and the seat area of the poppet disk. Thereby there is determined the force balance (the spring force and the gas pressure at both sides) effecting the poppet valve at first predominantly through the spring force and the pressure differential on the step piston. The pressure forces, which naturally engage the substantially smaller valve poppet like before and thereby also the above-mentioned influence of the pressure reduction caused by the flow, are now of secondary significance whereby a sufficiently large closing force surplus may be ensured without problems and re-opening of the disk valve is dependably avoided at the end of the working stroke under the described conditions.

The pressure influencing the step area, which corresponds to the difference between the two step piston areas or to the space defined thereby, may be chosen relatively at any amount (of pressure) but it should, of course, lie relatively way below the fuel pressure itself. In the most simple case it is suggested in this context, according to one embodiment of the invention, to pressurize the space defined by the step area on the step piston with ambient pressure via a connecting line or via the connection of a vent line or the like.

According to another preferred development of the invention, it is suggested in the lastly mentioned context that the space defined by the step area on the step piston is connected to the fuel supply via a pressure regulator inserted into a connecting line. Thereby, the differential pressure, which is important for the dynamics of the valve, between the fuel supply line and the pressure influencing the step surface may be kept constant and operational functioning of the valve may altogether be achieved largely independent of the gas line pressure.

According to another preferred development, the space defined by the step area on the step piston may, however, be connected to the intermediate chamber located between the solenoid valve and the valve disk via a connecting line and a check valve arranged therein blocking in the direction of the space defined by the step area. The pressure corresponding to the minimum pressure in the intermediate volume is adjusted thereby in the space defined by the step area. Based on the small leakage occurring in reality always on the seal of the step piston, the pressure adjusts to the periodically recurring minimum intermediate volume pressure after several working cycles whereby the operating function of this embodiment is also largely independent from the operating pressure in the fuel supply line. This embodiment offers additionally the advantage that only interior connecting channels are required and that one can do without the attachments of additional connections for the discharge of possible leaking gas as well as the employment of pressure regulators whereby assembly requirements are considerably reduced.

The invention will be better understood by reference to the attached drawings taken in conjunction with the following discussion.

BRIEF DESCRIPTION OF THE DRAWINGS

FIGS. 1–3 depict three embodiments of valve according to the present invention.

DETAILED DESCRIPTION OF THE PREFERRED EMBODIMENTS

In all three illustrated embodiments a valve is depicted for bringing gaseous fuel into a combustion chamber symbolically identified with the number "1" of a gas engine that is also not further illustrated. The valve essentially includes a solenoid valve 5, which controls the fuel supply 2 via the connections 3, 4, the solenoid valve being powered by electric current making it thereby reversible whereby the valve includes also an adjoining check valve 7 closed by the power of a closing spring 6 and disposed in the direction of the fuel flow.

The check valve 7 is designed as a poppet valve and opens the connection to the combustion chamber for the gas flowing at the corresponding pressure from the opened solenoid valve through the connecting line 8 to the intermediate chamber 9. To make this opening (and also closing) of the poppet valve 7 largely independent from the above-mentioned pressure conditions at the valve poppet (head) 10 with its ambient gas flow, the closing element (stem) 11 of the poppet valve 7 is connected to a step piston 12 at the side facing away from the valve poppet 10. The step piston 12 is influenced by the fuel pressure existing in the space between the solenoid valve 5 and the valve poppet 10 at the piston's larger upper side 13 and the opposite smaller underside 14 (defining the intermediate chamber 9), and whereby the piston's step area 15, being the difference in diameter between the two step piston areas (13, 14), is biased by an essentially constant pressure. Since the step area (15 (being the difference in diameter between 13 and 14) is significantly larger than the actuation area of the poppet valve 7, which remains between the stem and the seat area of the valve poppet 10, the actuation area of the check valve cannot be effective as a significant contributor for the total effective force balance (the closing spring 6, the respective pressure in the combustion chamber 1, the pressure on the sides 13 and 14, and the pressure on the step area 15) based on the developing opening force by the interior pressure becoming effective thereon so that unintended opening of the check valve may be simply and dependably avoided in the above-described manner.

The relatively large mass of the step piston 12, compared to the other closing element 11, may be additionally used specifically for movement throttling or movement control of the valve poppet 10. In general, it may be easily ensured in the described manner that the poppet valve 7 allows flowing of the fuel into the combustion chamber 1 only then when it is required or desired for the respective working stroke of the gas engine.

Aside from the symbolically illustrated connection line 8 between the solenoid valve 5 and the intermediate chamber 9, a corresponding connection may also be established to the channels 16 (illustrated by a dotted line in all figures) from the upper side 13 to the underside 14 of the step piston 12. Only for the sake of completeness, gasket rings 17 are located on both sides of the step piston 12 whereby, of course, also a plurality (of gasket rings) may be provided according to needs. Furthermore, there is illustrated in the lower area of the closing element 11 a guide 18 having flow-through channels 19 to guide the closing element 11.

In the embodiment in FIG. 1, the space 20 defined by the step area 15 on the step piston 12 is biased by the ambient pressure via a connection line 21 and the space is biased thereby with pressure of a constant level independent (of the pressure) of the fuel supply.

According to FIG. 2, the space 20 defined by the step area 15 on the step piston 12 is connected to the fuel supply 2 via a pressure regulator 23 inserted into a connection line 22 whereby the differential pressure necessary for the dynamics of the valve is maintained constant between the supply line 2 and the step area 15, and whereby operational functioning of the valve may be achieved that is largely independent from the fuel supply pressure.

Finally, according to FIG. 3, the space 20 defined by the step area 15 on the step piston 12 is connected to the intermediate chamber 9 located between the solenoid valve 5 and the poppet valve (or correspondingly the space above the upper side 13 of the step piston 12) via a connecting line 24 having a check valve 25 arranged therein blocking in the direction of the space defined by the step area 15. In space 20 there is thus established a pressure that corresponds to the minimum pressure existing in the intermediate chamber 9 which pressure adjusts itself after several working cycles to the periodically recurring minimum intermediate volume pressure based on the practically always existing small leakage on the gasket rings 17. Thereby, the operational functioning of this embodiment is also independent from the operation pressure of the fuel supply line 2.

I claim:

1. A valve assembly for controlling flow of pressurized gaseous fuel from a supply line to a combustion chamber of a gas engine, said valve assembly comprising:

a check valve which comprises a housing that defines a first end and a second end, said second end defining an opening for supplying pressurized gaseous fuel to said combustion chamber, said opening having an inner diameter; a movable step piston located in said housing, said step piston defining a first portion facing said first end of said housing and a second portion facing said second end of said housing, said first portion having a larger diameter than said second portion so as to define an annular step area therebetween; a poppet which includes a stem which extends from said step piston to said second end of said housing and a head which can open and close said opening in said second end, an area defined between said stem and said inner diameter of said opening being less than an area of said annular step area; and a spring for biasing said step piston so as to move said poppet to close said opening, a solenoid valve connected to said supply line, a first delivery line for delivering pressurized gaseous fuel from said solenoid valve to a first space in said housing between said first end thereof and said step piston, and a second delivery line for delivering pressurized gaseous fuel from said solenoid valve to a second space in said housing between said second end thereof and said step piston, said housing defining an annular chamber around said annular step area of said step piston for fluid medium at essentially constant pressure.

2. A valve assembly according to claim 1, including a connection line for communicating said annular chamber with ambient atmosphere.

3. A valve assembly according to claim 1, including a connection line for communicating said annular chamber with said supply line, said connection line including a pressure regulator.

4. A valve according to claim 1, including a connection line for connecting said annular chamber to said first space, said connection line including a check valve.

* * * * *